Figure 8:
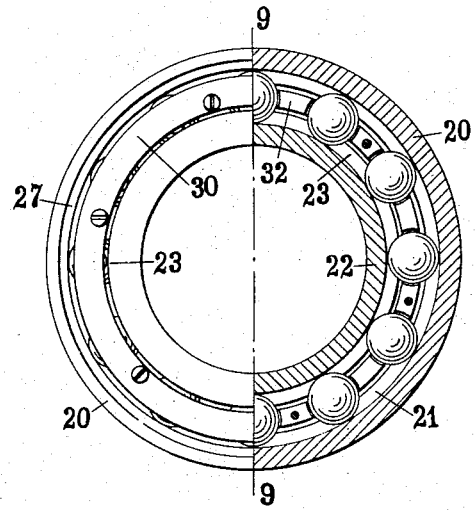

M. MOSSIG & E. SACHS.
BALL BEARING.
APPLICATION FILED AUG. 7, 1907.
1,146,271.
Patented July 13, 1915.
2 SHEETS—SHEET 1.
Fig. 1.
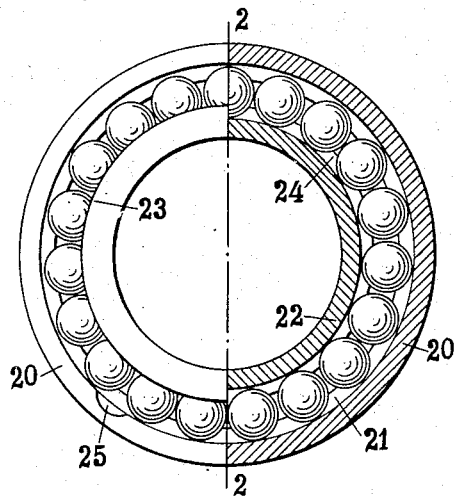
Fig. 2.
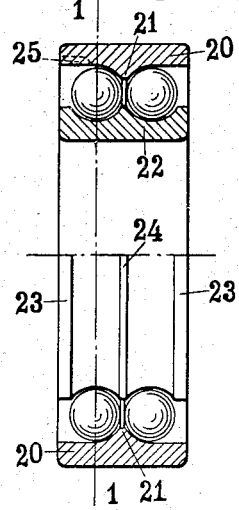
Fig. 3. Fig. 4. Fig. 5. Fig. 6.
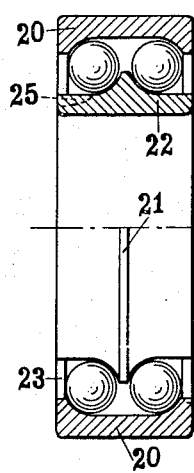 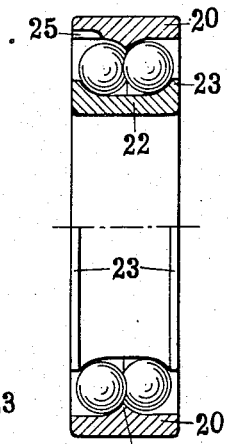 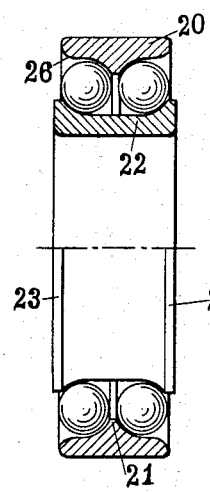 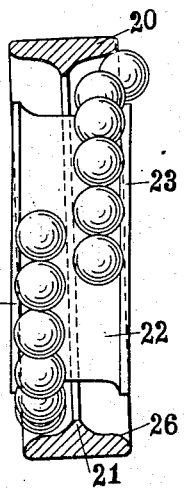
Fig. 7.
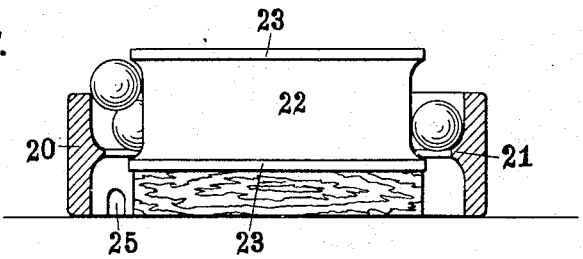
Witnesses:
M. C. Lyddane
Edward R. Stitman
Inventors:
Max Mossig
Ernst Sachs
By Julian C. Dowell & Son
their attys.

M. MOSSIG & E. SACHS.
BALL BEARING.
APPLICATION FILED AUG. 7, 1907.

1,146,271.

Patented July 13, 1915.
2 SHEETS—SHEET 2.

Witnesses:

Inventors:
Max Mossig
Ernst Sachs
By Julian C. Dowell
their attys.

UNITED STATES PATENT OFFICE.

MAX MOSSIG, OF BERLIN, AND ERNST SACHS, OF SCHWEINFURT, GERMANY, ASSIGNORS, BY MESNE ASSIGNMENTS, TO THE BEARINGS COMPANY OF AMERICA, OF JERSEY CITY, NEW JERSEY, A CORPORATION OF NEW JERSEY.

BALL-BEARING.

1,146,271.   Specification of Letters Patent.   Patented July 13, 1915.

Application filed August 7, 1907.   Serial No. 387,517.

*To all whom it may concern:*

Be it known that we, MAX MOSSIG and ERNST SACHS, subjects, respectively, of the King of Saxony and of the King of Bavaria, residing, respectively, at No. 26 Arndt street, Berlin, Germany, and at No. 24 Schultes street, Schweinfurt, Germany, have invented new and useful Improvements in Ball-Bearings, of which the following is a specification.

This invention relates to ball bearings having several rows of balls with undividable race rings in which the balls are arranged in separate race grooves, and the invention more especially relates to such a construction of the said grooves that as large as possible number of balls can be introduced, while at the same time the bearing is capable of taking up axial pressures in either direction.

In ball bearings with a single row of balls with lateral supporting shoulders, when the race rings are made each in one piece, there are considerable difficulties in introducing the balls and it is necessary to make use of special auxiliary means, such as relative eccentric displacement of the rings, or filling openings, in order to enable the balls to be introduced between the race rings. The said difficulties are, of course, considerably greater in the case of ball bearings with several rows of balls, as the rows of balls, when being introduced, interfere with each other, and the introduction of cage rings between the rows of balls necessitates complicated measures. These difficulties in the assembling of ball bearings with several rows of balls are obviated according to this invention by the construction of the race grooves in such manner that first of all one row of balls can be introduced independently and separately, and thereupon the other one can be introduced by means of special, if desired well-known, means, and the introduction is thus facilitated to such an extent that a larger number of balls can be introduced than would be possible by means of the well-known eccentric adjustment of the rings, and in certain circumstances the two grooves can be even completely filled with balls.

The invention has the further advantage that the race rings can be made without any interruption of their smooth surface (which interruptions are liable to produce injurious strains in the material), and, even when filling openings are used, a single small notch on one side of only one of the rings is sufficient for enabling the whole number of balls to be introduced into the two race grooves, and further the said notch can be arranged at such a point that in the event of a pressure being exercised in the axial direction the balls of the corresponding row are not driven into the said notch or recess, but in the opposite direction. Another advantage of this arrangement consists in an axial pressure being always taken up by one row of balls, since the axes of rotation of the balls then take up a position at an angle to the axis of the rings, while the other row is not affected by it, and has to support only the pressure of the load, so that by the said distribution a great security is obtained. In each case the balls travel in the grooves, so that the bearing can support a very high load.

Several constructional forms of the bearing according to this invention are illustrated in the accompanying drawing, which forms a part of this specification.

Figure 10:
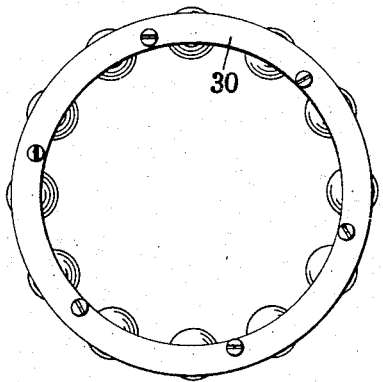
Figures 11, 12:
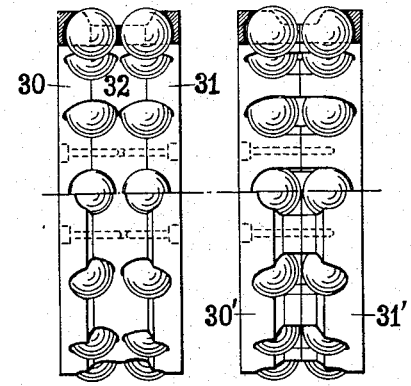
Figure 13:
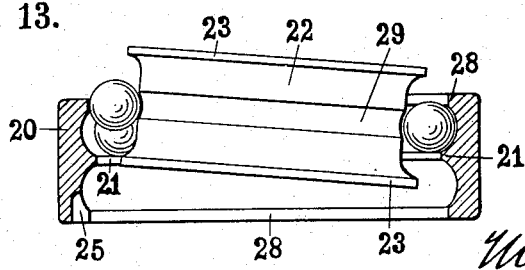

Figure 1 shows a bearing partly in side elevation and partly in section through one row of balls. Fig. 2 is a cross-section through the bearing on line 2—2 of Fig. 1. Figs. 3 and 4 are sections through other constructions. Figs. 5 and 6 show another construction of the bearing, in section, in different positions. Fig. 7 illustrates the introduction of the balls. Fig. 8 is a side elevation, partly in section, and Fig. 9 a cross-section on line 9—9 of another construction. Figs. 10–12 show, in side elevation and front elevation, partly in section, two different constructions of a ball spacer or cage for the bearing. Fig. 13 shows another form of introduction of the balls, applied to a special construction of the bearing.

Similar characters of reference designate similar or equivalent parts throughout the several views of the drawing.

In the bearing according to this invention the axial pressure or end thrust is taken up by only one row of balls, while the other one supports the load it has to carry, so that in any case and at any stage of operation, the two rows of balls become automatically adjusted, and the forces or strains distributed in a favorable manner. To that end, and to permit introduction of the balls as aforesaid, the bearing is constructed on the principle stated, in general terms, as follows: Instead of running a double row of balls in four separate grooves, as in former constructions, the confronting peripheries of the two bearing rings (for two rows of balls) are provided with not less than three nor more than five annular supporting ribs or shoulders, which establish the races for the balls and confine the latter therein between the rings. The disposition of said ribs or shoulders is such that both rows of balls are embraced between a pair of lateral ribs on one ring, and held thereby oppositely to a medial rib on the other ring; these being the only essential ribs of the construction, though four and even as many as five such ribs could be used without it being necessary to make more than one charging or filling opening, and that only on one side.

The arrangement is such that one row of balls can be introduced by relatively displacing the rings axially, thereby enlarging the annular passage between the edges of the rings at one side, so as to receive said row of balls, whereupon the rings are again brought into their normal relative position; which requires either that all other annular ribs than the three essential ones specified be omitted, or that only one ring be provided with lateral ribs embracing the two rows of balls between them, or else that only one ring have a medial rib while the other have an annular depression confronting it. Provision is made for introducing the other row of balls in various ways, either through a charging passage or by making use of a tilting or oblique displacement of one ring relative to the other, in which latter event the bearing can be only partially filled. It follows therefore that the said shoulders can be arranged in the most varied manner relatively to each other, as can be seen from the few constructions shown in the drawings.

In the ball bearing shown in Figs. 1 and 2, altogether four shoulders are used, namely on the outer race ring 20 a central rib 21 against which rests the balls of the two rows at opposite sides, while the inner race ring 22 is provided with two laterally projecting edges 23 and a central rib 24, so that two grooves, semi-circular in cross-section, are produced receiving the balls. The said rib 24 is not absolutely essential for the working of the bearing, and is here used only to strengthen the construction or to guide the balls, as for receiving the axial pressure in both directions, the three shoulders 21 and 23, 23 are sufficient as already stated, and as can be seen from the constructions shown in Figs. 3-9. The said shoulders can be interchanged as desired on the outer and inner race rings (Fig. 3) and if desired they can be given such a shape and position that the balls of the two series are put in in a staggered order relatively to each other (Fig. 4). It is however possible also to make use, if necessary, of more shoulders when the special conditions make it desirable (Fig. 13) and the said additional shoulders can be arranged either symmetrically or only with one row.

The introduction of the balls is effected for the one row by axial shifting or oblique setting of the two race rings 20 and 22 relatively to each other, and again for the second row either by placing them obliquely or by means of special filling openings 25. If it is desired to fill the bearing completely with balls, first for instance, one ring is partly pulled out laterally from the other (Fig. 7) or placed obliquely (Fig. 13) so that one edge 23 completely or partly projects and affords a passage for the balls. After the completion of the row of balls, the rings 20 and 22 are again brought into their proper relative position, and the balls of the other series introduced through the charging opening 25, which may be axial or any other known form, if desired, with the application of pressure in the usual manner if the said opening is not to extend on to the ground of the race. Each of the two race rings can be provided on the same side with a charging opening, which openings then complement each other, which arrangement is well known in the art and therefore not illustrated, but as will be seen from the drawing, it is sufficient to arrange a single charging or filling opening 25 only on one of the rings, namely in the ring containing the rib 21, which arrangement has the advantage over the interruption of edge 23 which could also be made, that in the case of an axial pressure acting on the said row, the balls are forced away from the opening. The partial filling of the bearing with balls can be effected in the same manner.

Figs. 5 and 6 or Figs. 8 and 9 show on the other hand, means which enable the balls to be filled in or introduced in a slightly different manner, since a relative oblique position of the race rings is utilized also for introducing the second row of balls for the purpose of obtaining a passage for the balls. To that end the race ring 20 is made slightly narrower or provided at its inner lateral edges with a rounded off portion 26 or the like, or, as shown in Figs. 5 and 6, the two provisions are simultaneously used. A bearing constructed as shown in Fig. 5, is filled with balls in the following manner: First, one race of the rings is supplied with a certain number of balls, for example as described in connection with Fig. 7. The balls are then assembled or pushed together, so that they occupy a part of the circumference of the race, whereupon the inner ring 22 is tilted with respect to the outer ring in such a direction that at a place of the other race, which is diametrically opposite to the assembled balls, the distance between the edge 23 and the rounded off portion 26 is increased, as shown in Fig. 6, and thus a sufficient passage provided for the balls to be introduced into the other race. After the introduction of the convenient number of balls of the second row, the rings are again brought into their proper position, whereupon the balls are distributed and held at the required distances apart by means of a spacer of suitable construction. The balls which during that introduction have been pushed together on the opposite sides of the two race grooves, can occupy slightly more than half the circumference of the corresponding race groove whereby the introduction of a comparatively large number of balls is rendered possible, the said number exceeding by several the number which could be introduced hitherto by means of the eccentric adjustment of the rings, which however could be used also in this case. This is partly favored by the fact that by the above-mentioned relative turning of the rings, space is simultaneously gained in axial direction at the widened portions, and consequently the balls can occupy an alternate or staggered position, while, when the rings are again brought into the co-axial position, the rows of balls extend and force themselves partly around the other half of the grooves.

Figure 9:
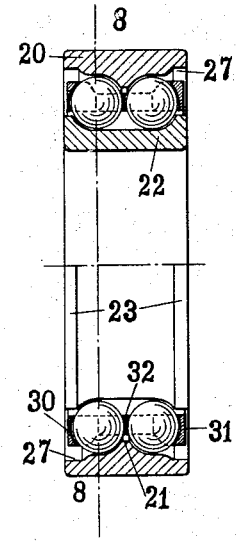

Instead of the rounded off portions 26 shown in Fig. 5, circumferential lateral recesses 27 may be provided in the ring having the central rib 21, as represented in Figs. 8 and 9, in order to make the introduction possible in the manner described with reference to Fig. 6. Filling in of the balls by tilting the rings relatively, as explained above, may also be effected with the use of a notch 25, which must be arranged in that place where the balls of the second series are to be introduced, but the constructions shown in Figs. 5 and 6 or 8 and 9 have the advantage that the rings are not cross-notched or interrupted at any point or do not show any change of dimensions throughout the whole of their circumferential extent and therefore no unequal strains could be produced during tempering. The described means 26 and 27 for the introduction of the balls between the rings are represented in the drawing as made on either side of the ring 20, for obtaining symmetry of the bearing, however it is evident that it will be sufficient for the described purpose to provide such means on one side only.

The introduction of the balls in the construction shown in Fig. 13, which relates to the special case when five supporting shoulders are used, is effected in a slightly different form. The outer race ring 20, in addition to the rib 21, is provided in this case with two outer, preferably lower, edges 28, while the inner ring 22 is provided in the center with a groove 29 or some other recess which enables the balls, when they are being introduced, to pass the edge 28.

Of course, in all the above cases, the two rows can be filled with the same or different number of balls, as required. By suitable combination of the above-mentioned means, bearings with three or four rows can be constructed in the same manner.

In order to enable the bearings to adjust themselves in such a manner that the pressure should be uniformly distributed on the two rows of balls, and on the other hand that axial pressures should also be taken up, the balls must be guided in such manner as to provide for a certain free adjustment, namely it must be possible to alter the position of the axis of rotation of the balls. This is effected in the retainer shown in Figs. 8–12 by reducing the central portion in the radial direction opposite to the rib 21 as in that way the balls are given the power of adjusting their axes of rotation at a greater or less angle to the axis of the bearing when, owing to axial pressure, they are pressed more strongly against the rib 21 and the shoulder 23, and therefore the balls come to rest thereon at different points. In the construction shown in Fig. 11, the spacer comprises three parts, a central ring 32 reduced in the manner described, and two outer wider rings 30 and 31 secured to the former by means of screws or in some other way and all provided with the desired number of hemi-spherical recesses with which, after being combined, they partly inclose the balls. The central ring 32 can be introduced into the bearing before the filling in of the balls, if desired, without interfering with the relative displacement of the rings. In the construction shown in Fig. 12, there are used only two rings 30′ and 31′ which are introduced from the opposite sides into the filled bearing and combined in a suitable manner. They are provided with axial longitudinal slots in which two balls (one from each of the two rows) are guided in pairs. This arrangement, owing to the free play in the axial direction, facilitates the relative adjustment of the two rows of balls in a special manner.

From the foregoing description it will be observed that the described construction and arrangement of parts, comprising two rows of balls running in uninterrupted raceways between confronting bearing surfaces of normally concentric rings, one of said rings having a narrow annular rib or dividing ridge entering between but only slightly separating two closely arranged rows of balls, and the other ring having a bearing surface confronting said ridge and providing at each side thereof an uninterrupted ball race and a marginal portion overhanging the balls at each side, provides a unitary ball bearing in which the parts are locked together solely by the interaction of the rings and balls.

When the rows of balls are arranged in a staggered order, the guide ring is preferably given a corrugated shape, if any used.

The ribs or shoulders on the race-rings provide what may be termed the "flanks" of the ball tracks on the rings, certain of which ball tracks are one-flanked, as all of them are in Fig. 3, for instance, and others are or may be two-flanked as indicated for example in Fig. 2.

We have disclosed several constructional forms of our invention in the accompanying drawing for the purpose of examples, but obviously the arrangement of the parts may be modified in different ways without departing from the principle of our invention, and combinations of the devices shown in the different figures may be made. The rib and shoulders may be distributed and interchanged on the two race rings as the special case may be, and the arrangement may be symmetrical in the two rows, or not, while spacers may be employed or dispensed with. We, therefore, do not wish to be limited to the illustrated constructions, but What we broadly claim as our invention, and desire to secure by Letters Patent, is—

1. A unitary annular ball bearing comprising two concentric rings, and a plurality of rows of balls between the rings, the axes of rotation of the balls being oblique to the axis of the shaft or concentric rings, the rings being integral structures and having grooves in their confronting surfaces to receive the balls, one of the grooves being open at one side throughout its circumferential extent whereby relative axial displacement of the rings will increase the distance between the open side of said groove and the outer wall of the coacting groove to permit insertion of the balls.

2. A unitary annular ball bearing consisting of concentric integral rings having annular ribs on their confronting circumferences, and two rows of balls running between the rings and supported by said ribs, the ribs projecting alternately from the opposed circumferences of the rings whereby axial displacement of the rings will increase the distance between coacting ribs to permit insertion of a row of balls at one side of the bearing and one of the rings having a lateral filling opening to permit insertion of a row of balls at the opposite side of the bearing.

3. A unitary annular ball bearing consisting of two concentric integral rings, and two rows of balls running therebetween, one of the rings having annular ribs embracing both rows of balls and the other ring having an annular rib entering between the rows of balls whereby axial displacement of the rings will vary the distance between the ribs to permit insertion of one row of balls, and said last-mentioned ring having a lateral filling opening in one side to permit insertion of the second row of balls.

4. A unitary annular ball bearing consisting of two concentric integral rings, and two rows of balls running therebetween, one of the rings having annular ribs embracing both rows of balls and the other ring having an annular rib entering between the rows of balls whereby axial displacement of the rings will vary the distance between the ribs to permit insertion of one row of balls, and one ring having a lateral filling opening in one side to permit insertion of the second row of balls.

5. A unitary annular ball bearing consisting of two concentric integral rings, and a plurality of rows of balls running therebetween, said rings having annular grooves in their opposed circumferences to receive the balls, a groove on one of the rings being laterally open at one side throughout the circumferential extent of the ring whereby axial displacement of the rings will permit the insertion of balls, and the grooves in the other ring having walls at both sides to embrace the balls and retain them in the grooves in the first-mentioned ring, one of the rings having a lateral filling opening in one side.

6. A unitary annular ball bearing consisting of two concentric integral rings, and a plurality of rows of balls running therebetween the axes of rotation of the balls being oblique to the axis of the shaft or concentric rings, said rings having annular grooves in their opposed circumferences to receive the balls, each groove on one of the rings being laterally open at one side throughout the circumferential extent of the ring whereby axial displacement of the rings will permit the insertion of balls, and the grooves in the other ring having walls at their outer sides to embrace the balls and retain them in the grooves in the first-mentioned ring.

7. A ball bearing comprising a ring having a rib with ball races at either side of said rib, a ring concentric thereto having a plurality of shoulders, and a plurality of series of balls arranged between the rib and the shoulders, in combination with a retainer for the balls reduced opposite to the said rib.

8. A ball bearing comprising a ring having a rib with ball races at either side, a ring concentric thereto having a plurality of shoulders, and a plurality of series of balls arranged between the rib and the shoulders, in combination with a retainer for the balls being reduced opposite to the said rib and consisting of a plurality of ring sections having recesses in their confronting faces adapted for receiving the balls.

9. A ball bearing having a plurality of series of balls in combination with a retainer reduced in diameter in the central part and consisting of a plurality of ring sections having recesses in their confronting faces which are adapted to receive the balls of a plurality of series.

10. A unitary annular ball bearing consisting of two concentric integral rings, and two rows of balls running therebetween, one of the rings having annular ribs embracing both rows of balls and the other ring having an annular rib entering between the rows of balls, whereby axial displacement of the rings will vary the distance between the ribs to permit insertion of one row of balls, one of said rings having a filling opening to permit the insertion of another row of balls.

11. A unitary annular ball bearing comprising two concentric rings, and a plurality of separated rows of balls between the rings, the rings being integral structures and having confronting bearing surfaces which contact with the balls on a line extending obliquely to the axis of the rings, one of the rings being open at one side of its bearing surface throughout its circumferential extent, whereby relative axial displacement of the rings will increase the distance between the open side of said ring and the confronting surface of the other ring to permit insertion of one of the rows of balls, the rings being locked together by the interaction between the bearing surfaces for another row of balls and such balls when inserted in place.

12. A unitary annular ball bearing comprising concentric rings and a plurality of closely arranged rows of balls between the rings, the rings being integral structures and having confronting bearing surfaces constructed to contact with the balls on a line extending obliquely to the axes of the rings when in concentric position, one of the rings having on its bearing surface an intermediate narrow dividing ridge entering between and slightly separating the rows of balls, and the other ring having a bearing surface confronting said ridge and providing at each side thereof an uninterrupted ball race and a marginal portion overhanging the balls, whereby the rings are locked together by the interaction of the rings and balls.

13. A unitary annular ball bearing comprising two concentric rings and a plurality of rows of balls between the rings, the axes of rotation of the balls being oblique to the axes of the shaft or concentric rings, the rings being integral structures and having ribs, the ribs projecting alternately from the opposed circumferences of the rings, whereby lateral displacement of the rings will increase the distance between coacting ribs to permit insertion of the balls.

In testimony whereof we have signed our names to this specification in the presence of two subscribing witnesses.

MAX MOSSIG.
ERNST SACHS.

Witnesses as to Max Mossig:
  HENRY HASPER,
  WOLDEMAR HAUPT.

Witnesses as to Ernst Sachs:
  LOUIS F. MULLER,
  MATHILDE K. HELD.